United States Patent [19]

Jalbert

[11] 4,258,356

[45] Mar. 24, 1981

[54] MULTI BAR ENCODING APPARATUS UTILIZING ACOUSTIC ENERGY

[75] Inventor: Vincent P. Jalbert, Middlebury, Conn.

[73] Assignee: SCM Corporation, New York, N.Y.

[21] Appl. No.: 892,814

[22] Filed: Apr. 3, 1978

[51] Int. Cl.[3] .......................... G06F 3/02; H04L 15/03

[52] U.S. Cl. .............................. 340/365 R; 178/17 C; 340/365 S; 400/479

[58] Field of Search ........... 340/365 A, 365 R, 365 S; 178/33 R, 17 C, 27; 400/472, 477, 478, 479; 35/5; 333/141

[56] References Cited

U.S. PATENT DOCUMENTS

| | | | |
|---|---|---|---|
| 1,953,066 | 4/1934 | Griffith | 178/33 R |
| 3,234,331 | 2/1966 | Holstein | 340/365 R |
| 3,603,983 | 9/1971 | Mitchell | 340/365 R |
| 3,725,908 | 4/1973 | Brisebarre | 340/365 A |

FOREIGN PATENT DOCUMENTS

| | | |
|---|---|---|
| 1070231 | 6/1967 | United Kingdom . |
| 1330742 | 9/1973 | United Kingdom . |
| 1348007 | 3/1974 | United Kingdom . |
| 1386070 | 3/1975 | United Kingdom . |
| 1420581 | 1/1976 | United Kingdom . |
| 1468036 | 3/1977 | United Kingdom . |

OTHER PUBLICATIONS

*IBM Technical Disclosure Bulletin*, vol. 14, No. 10, Mar. 1972, L. Arosenius, "Ripple-Sensing Keyboard".

*Primary Examiner*—John W. Caldwell, Sr.
*Assistant Examiner*—James J. Groody
*Attorney, Agent, or Firm*—Armand G. Guibert; Milton M. Wolson

[57] ABSTRACT

An encoding apparatus in which strikers actuated by the keys of a keyboard, for example, impact selected ones of a group of parallel bars (equivalent to sonic delay lines) at points substantially equally distant from single transducers located on each bar. A timer controls transfer of data signals—the transducer output of the bars—to a display, a printer, etc. The transfer includes storage in a multibit electronic latch.

37 Claims, 5 Drawing Figures

10
8
79A-F
22A
79A
79F
79G
12
23
25
18
21
72
19
22F
22G
20G
6R
12R
14
2a.
48
50
26
46
36
34
39
52
16
62
80A-F
80F
80G
80A
116
32
33
28
30
9
40
20A
20A-F
82A-F
82A
82G
82F
20F
70
6L
76
74
75
24
114A-F
114A
7
114F
12L
150
20E
20H
154
152

MULTI BAR ENCODING APPARATUS UTILIZING ACOUSTIC ENERGY

BACKGROUND OF THE INVENTION

1. Field of the Invention

This invention relates to encoding apparatus and to methods associated with these. More particularly, the invention relates to application of acoustic methods to encoding keyboards. The present application is an improvement of the acoustic method disclosed in my copending application Ser. No. 853,778 filed Nov. 21, 1977 and having the same assignee. To the extent appropriate to the present invention, the disclosure of that application is incorporated herein by reference.

2. Description of the Prior Art

Encoding apparatus for use with many and varied types of equipment have long been known. Yet, there is a continued search for encoders having both low cost and high reliability.

One well-known type of encoding keyboard makes use of light beams in parallel channels and key-operated code levers which are oriented at right angles to the channels and can be placed in a position to block the beams of light in selected ones of the channels, e.g., as disclosed in U.S. Pat. No. 3,032,163. Such equipment requires a multiplicity of light sources and a multiplicity of sensor elements. The light sources and the sensor elements are all relatively expensive and require additional power sources, the light sources in particular consuming appreciable power. Furthermore, if one of the light sources fails, or, worse yet, if the power supply for the light sources fails, there is no way of operating the system even if all the sensors are in good condition.

An encoding apparatus based on use of acoustical wave fronts in rods has been disclosed in the above-mentioned copending application and specifically applied to a keyboard. The technique disclosed there is based on determination of an elapsed time. That approach is self-powered and self-strobed and requires no electrical or mechanical power sources for generating the code signals. A source of power is necessary, of course, for the electronic elements (electronic counters and logic circuitry) required for determining the elapsed time and expressing it as code corresponding to the key depressed. While it is a considerable improvement over known art, this last keyboard has significant limitations. For instance, if the code for the keys must be different from the output of the counters (usually binary), then a ROM ("read only memory") must be provided for conversion of the counter output to a desired code. Furthermore, though the above-mentioned keyboard making use of a single acoustic rod is simpler and cheaper than prior art keyboards, there is still a need for less logic circuitry and simpler and less critical input circuitry. In addition, it has been found that an encoding apparatus based upon elapsed time determinations on acoustic waves of the type disclosed in the copending application is somewhat sensitive to mechanical tolerances, striker wear, and temperature variations. Accordingly, there is need for an even more economical, highly reliable encoding apparatus having even less parts subject to failure and requiring even less power to operate.

SUMMARY OF THE INVENTION

It is, therefore, an object of the invention to achieve an improved encoding apparatus by use of an acoustic technique.

Still another object is to provide a simple, inexpensive and yet highly reliable encoding keyboard.

Finally, it is an object of the invention to provide an encoding keyboard which is self-powered and self-strobing, requiring minimal electrical power and no mechanical power other than the power of the operator's finger to obtain the desired result: supplying to a utilization device in a very simple manner, an arbitrary code representative of the key depressed.

The inventive concept then is that of an apparatus for generating a code representative of a mechanical motion, the apparatus containing n isolatingly supported members for transmitting vibratory energy, means inducing such energy within at least a selected one of the members in response to the mechanical motion, and means operatively connected to each of the n members for transducing the induced energy into respective bits of the n-bit code representative of the mechanical motion.

The encoding apparatus of the invention may be in the form of a keyboard having a number of depressible keys, each identifiable by a discrete n-bit code and associated with n members for propagating acoustic energy, each key being capable of inducing such energy within at least a selected one of the n members when that key is depressed, the acoustic energy forming a wave front traveling within each selected member, and there being means operatively connected to each of the n members for transducing a wave front therein into a respective signal, and means connected to the transducing means and operable to generate the n-bit code identifying the depressed key in response to the signals from the transducers of the selected members.

As another feature, in addition to the n members, one may include a similar (or even identical) member operated in response to depression of any of the keys, the additional member serving to discriminate against extraneously-originated inducements of acoustic energy within any of the n members, so as to prevent false generation of n-bit codes. Other objects and features of the invention as well as advantages of same will be found in the following detailed description of a preferred embodiment as illustrated in the accompanying drawing.

FIG. *2b* is a front view of a portion of the key element of FIG. *2a*, showing its eccentric engagement with part of the coding apparatus according to the invention.

Figure 3:
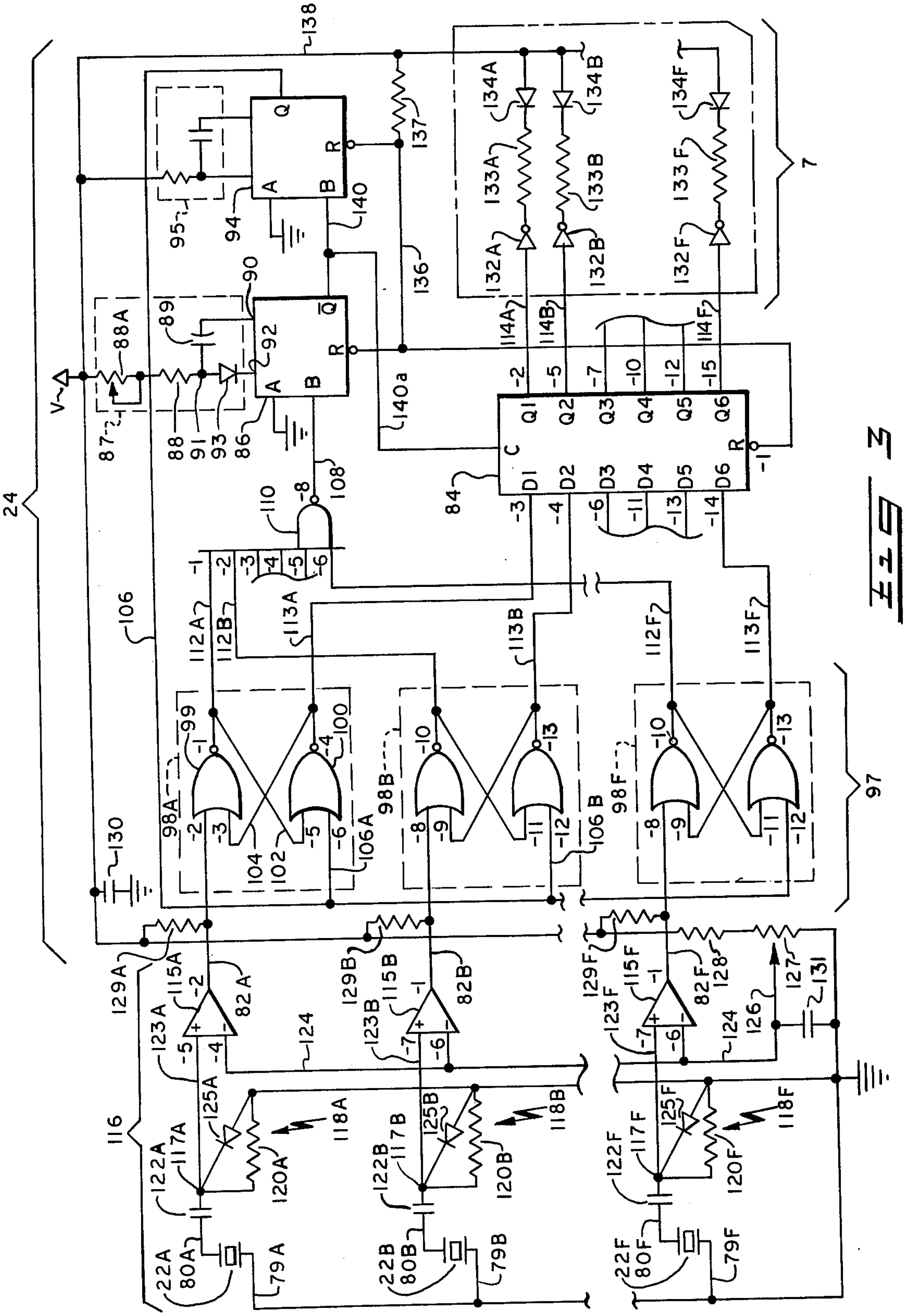

FIG. 3 is a detailed schematic of the electronic portion of the apparatus including the signal conditioning circuitry.

Figure 4:
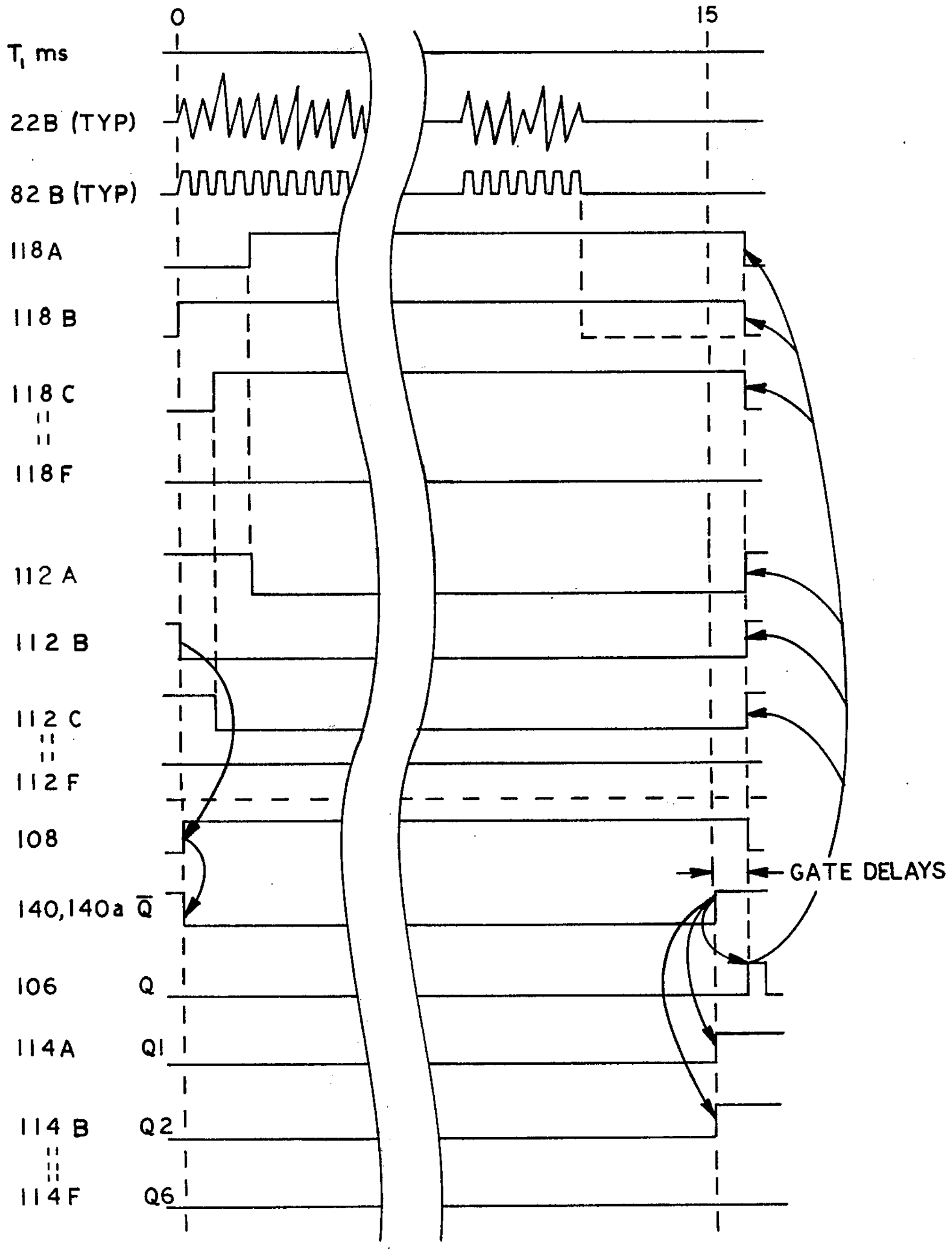

FIG. 4 is a timing diagram with respect to various signals.

Figures 1, 5:
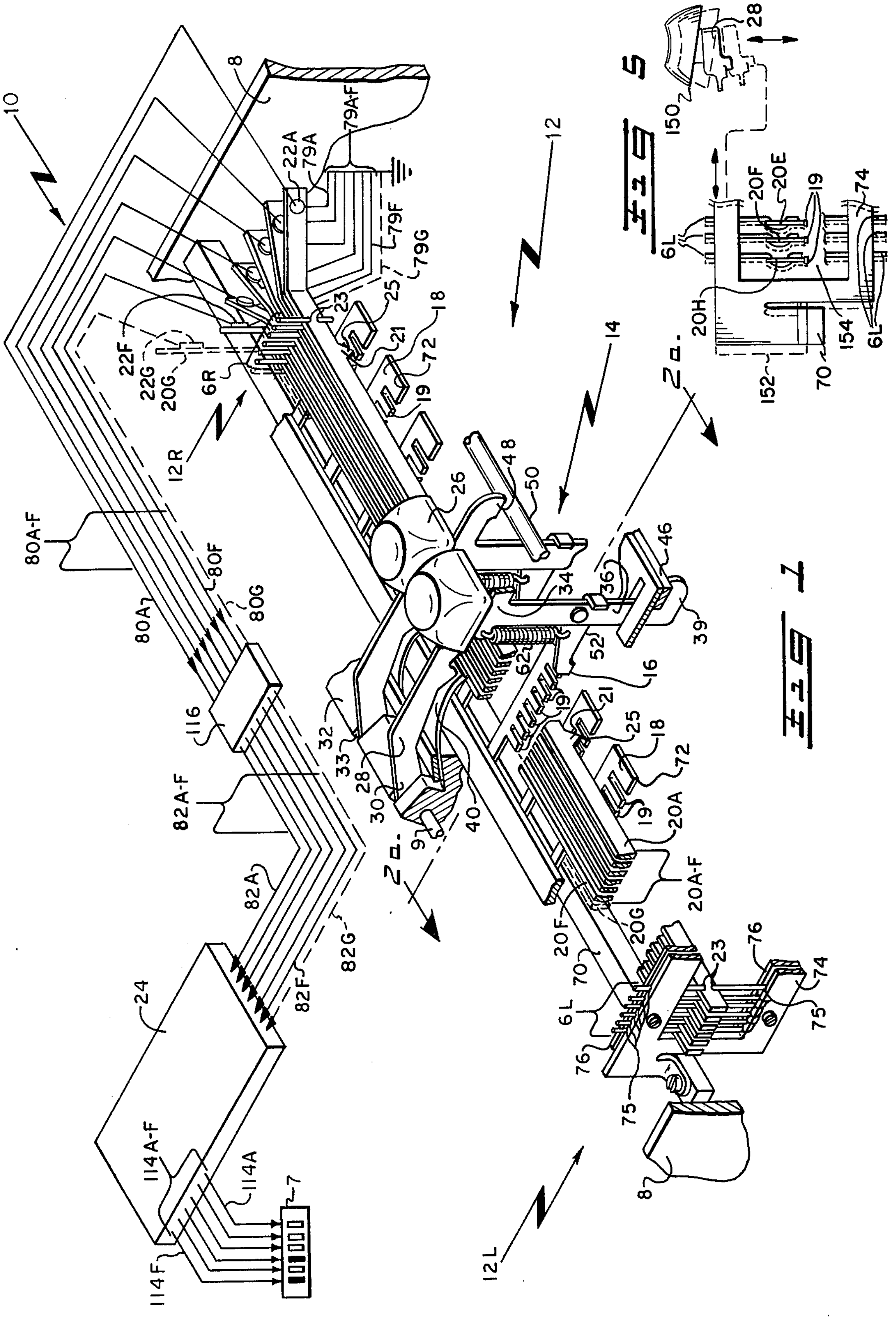
FIG. 1 is a combined pictorial and schematic of a typical keyboard with indication of the modification necessary to achieve the encoding according to the invention (the acoustic coding member in broken outline relating to another version); and FIG. *2a* is an enlarged cross-sectional side view of the keyboard of FIG. 1 showing one key element at its rest position in relation to the acoustic coding members of the invention.

FIG. 5 is a left side view of another modification of the invention in which a further bar is activatable as a function of the position of a shift key.

In these figures, the reference numerals relating to the key mechanism for inducing acoustic energy in the coding members are identical to those in the copending application, for convenience.

DESCRIPTION OF THE INVENTION

For ease of understanding, an overall description will be given first. Referring to the drawings and more particularly to FIG. 1, it is seen that according to the present invention, a code generating or "encoding" apparatus 10 includes, in general: an actuator 16, a sound wave or "acoustic" wave inducer 18, elongated members 20A–F (the quantity being actually determined, as a minimum, by the number of bits "n" in the desired code—the bar 20G in broken outline being applicable to an alternative described later) in which may be propagated diverging sound waves generated selectively by the inducer 18 in response to the actuator 16, transducing means 22A–F (referred to as "transducers" hereinafter, and again respectively designated A–F corresponding to each elongated member) for converting the sound waves into coded sets of electrical signals, the transducers 22A–F being so located with respect to the inducer 18 of the diverging waves that each electrical signal of the coded set is produced at about the same time; and a logic unit 24 for appropriately-timed sampling of the code-form signals and for resetting the system after the sampling.

As used herein, it will be understood that the terms "acoustic" and "sound" are intended to be interchangeable and to encompass all vibratory energy, i.e. not only the preferably audible propagated disturbances involving motion of a medium, but also all inaudible phenomena of that type which could likewise be transduced.

Having given an overall description of the encoding apparatus according to the invention, the following detailed description will now be provided.

Still referring to FIG. 1 and also to FIG. 2*a* for greater clarity, one implementation of the above-mentioned encoding apparatus 10 applicable to a typewriter keyboard 12, say, is as follows:

The codes are to be representative, for example, of the depressing of a selected one of the keybuttons 26 on character keylevers 28 of a keyboard 12. Thus, as shown in FIG. 1, each keybutton 26 of keyboard 12 is associated with an individual one of the inducers 18. Each acoustic wave inducer 18 may be a resilient striker (as it will be termed hereafter for simplicity) in the form of a cantilevered, comb-like spring deflectable by the actuator 16. Each striker 18 has laterally-projecting teeth 19 corresponding in number to the quantity of elongated acoustic members 20A–F. These last are preferably long bars (as they will be termed hereafter for convenience) of rectangular cross-section extending in parallel alignment with the teeth 19 from one end 12L of keyboard 12 to its other end 12R. Each of the bars 20A–F, relatively closely spaced but supported in acoustical isolation from each other and from the typewriter frame 8, is differentially provided with triangular tabs 21 projecting downward at selected positions for coding purposes. The strikers 18 are spaced along bars 20A–F at approximately equal intervals. Each striker 18 is normally under stress when at rest, being loaded against the tips 25 of the one or more tabs 21 at that position on bars 20A–F, and is engageable with the actuator 16 when a respective keybutton 26 is depressed by an operator. Through the action of a key mechanism 14 incorporating actuator 16 and described more fully below, depression of any keybutton 26 only flicks its striker 18—that is, momentarily deflects that striker 18 and then releases it. After that striker 18 has been released, stored flexural energy returns it to the normal position, its teeth 19 then giving a sharp blow to those of the bars 20A–F which bear a triangular tab 21 adjacent teeth 19.

Reverting now to the key mechanism 14, one form suitable for use in the keyboard 12 associated with the encoding apparatus 10 according to the present invention, is that disclosed in the above-mentioned copending application and identified by the same reference numerals, only the essentials being repeated herein. It should be understood that other mechanisms could be used equally well.

Keylevers 28 of the keyboard 12, which carry the keybuttons 26, are pivotally supported at one end 30 by a shaft 9 passing through a slotted keylever guide 32 attached (not shown, but known) to the frame 8 of the typewriter, there being one keylever 28 in each slot 33 of keylever guide 32. Each keylever 28 engages a respective cantilevered spring 40 made of spring steel, say, and having one end 42 clamped to a part of guide 32 (again, attached to the typewriter frame 8 in known fashion) and serving to return keylever 28 when the operator depresses and then releases keybutton 26.

At its forward end 34 (the term "forward" being used in the context of the keyboard 12 being at the front of the machine, as is usual) each keylever 28 has an extension 36 with arms 39, 48 which contact bars 46, 50 respectively serving as an upstop and downstop for the keylevers 28. Actuator 16 is provided on extension 36 for operative movement of striker 18 when keybutton 26 is depressed, the actuator comprising one arm 16 (as it will be termed hereinafter) of a bellcrank 52. A tension spring 62 holds bellcrank 52 yieldably in the position shown, allowing arm 16 to bypass striker 18 on return movement of keylever 28 subsequent to a flicking of striker 18.

Figure 2A:
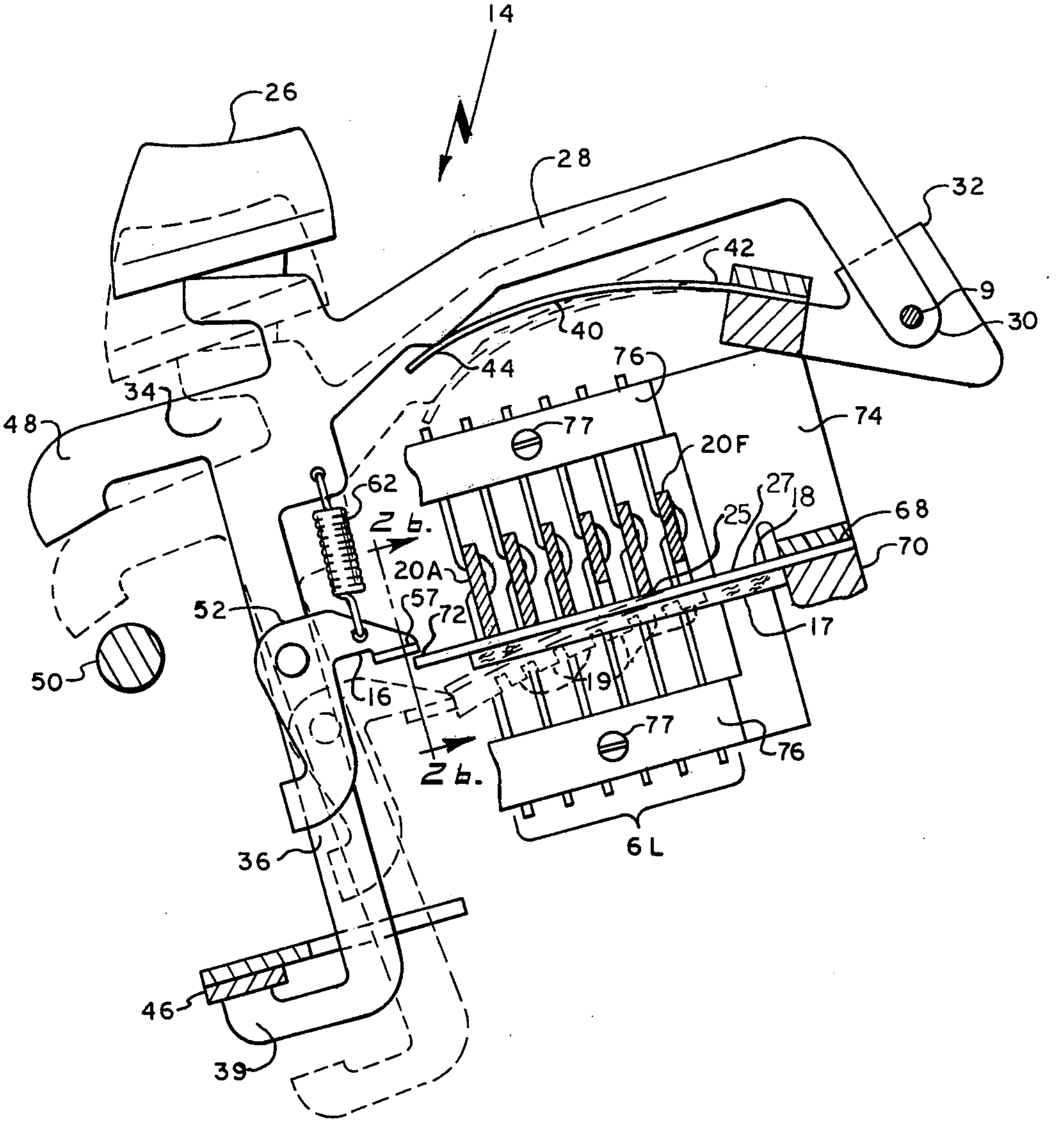

Assuming that the code has six bits (more than sufficient for the keyboard 12 of the usual typewriter), then there are required six bars 20A–F, one or more of which have acoustic energy induced in them by impact from a given striker 18 actuated by the related one of keylevers 28, as seen from FIGS. 1 and 2*a*. The bars 20A–F are preferably made of rectangular steel stock approximately 1/16th inch (1.59 millimeter) thick and 12 inches (30.5 centimeters) in length. The bars 20A–F are seen to be supported near each end 12R, 12L in a manner such that they are acoustically isolated from one another and from external effects such as motor vibration or environmental shocks. In this respect, it is noted that in the copending application, the rod (20) disclosed therein was isolated by a cushion (80) made of cork or plastic foam so that vibration or shocks transmitted to its base (82) by the frame (92) would not cause generation of false signals, but this method of isolation proved unsatisfactory for use with the present invention because the relatively close spacing of the bars 20A–F—required for greater uniformity of impact and desirable for substantial simultaneity of generation of the code bits—increased the severity of cross-talk. Herein, the identical supporting structures provided each of the bars 20A–F consist of wire sets 6R, 6L located toward the right and left extremities of each bar 20 (i.e. near 12R, 12L), each wire in the sets 6R, 6L being threaded through a respective pair of holes 23 located near each end of a bar 20, and preferably one hole being above and the other below the bar's midline. The upper and lower ends of the right and left sets of wires 6R, 6L are clamped to corresponding portions of a tension frame 74 by use of strips 76 fastened to frame 74 by means of one or more screws 77, as shown in FIG. 2*a* (clamping of wires 6R not being shown in FIG. 1 for better visibility of other portions of the structure). The wires of sets 6R, 6L are held taut during the clamping process and their relative positions are adjusted so as to align the tips 25 of the tabs 21 substantially in a common plane evident in FIG. 2*a*. The tautness of the wires in sets 6R, 6L holds bars 20A–F securely, once clamped. For even stronger grip, wires 6R, 6L may be bonded to the bars 20A–F, e.g. with an epoxy glue. Also, for convenience, proper spacing between the bars 20A–F may be achieved by providing grooves 75 in frame 74 and/or strips 76, which grooves receive a portion of the periphery of wires 6R, 6L.

Figure 2B:
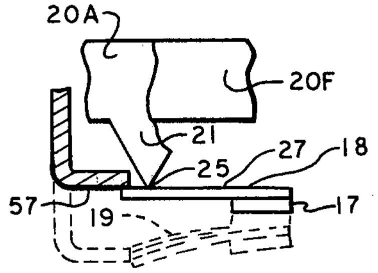

As seen in FIGS. 2*a* and 2*b*, each striker 18 preferably has a straight upper surface 27 and the tips 25 of triangular tabs 21 projecting downward from bars 20A–F lie substantially in a plane defined by all surfaces 27 of all the strikers 18. As a result, all of the bars 20A–F adjacent a given striker 18 are potentially contactable by the teeth 19 of that striker 18. The word "potentially" is used because, in general, the bars 20A–F will not all have tabs 21 there which can be contacted, being coded by provision of the tabs 21 only at predetermined locations adjacent to corresponding ones of the teeth 19, as will be recalled. Hence only a discrete, particular combination of bars 20A–F will have sound waves induced in them by contact with teeth 19 of a given striker 18 actuated as the operator depresses the related keybutton 26. It will be obvious to those skilled in the art that the depth of the tabs 21 must, of course, be such that even with the fullest travel of teeth 19 of striker 18 and considering possible warpage, etc. of these teeth, only the tabbed ones of bars 20A–F will receive an impact upon depression of keylever 28, the teeth 19 being clear of the non-selected (tabless) ones of bars 20A–F at all times.

Operation of key mechanism 14 to induce sound energy within the selected ones of the bars 20A–F will now be described briefly in connection with FIG. 2*a*. Depression of keybutton 26 causes keylever 28 to pivot counterclockwise. The ear 57 at the rearward tip of arm 16 of bellcrank 52 then engages the free end 72 of resilient striker 18 which it overlies and deflects it from the first or rest position shown in solid lines. When keylever 28 comes to the position shown in dotted lines, the free end 72 of striker 18 slips out of engagement with ear 57, release occurring prior to abutment of keylever 28's arm 48 against downstop 50. Upon its release, resilient striker 18 springs back to its first position (solid lines) where it strikes those of the bars 20A–F provided with tabs 21 adjacent the teeth 19 of that striker 18. As best shown in FIG. 2*b*, an eccentric engagement between ear 57 and the end 72 of striker 18 is preferred for the present invention in order to provide a major (or at least prominent) torsional contribution to the flexure of striker 18 such that greater uniformity of impact is attained between the tabs 21 of the furthest separated bars 20A and 20F and the corresponding teeth 19 of striker 18. Preference for more nearly torsional flexure of striker 18 is another point of difference between the structure used herein and that disclosed in the copending application. Uniformity of impact is desirable herein in order to permit use of low cost circuitry described subsequently. Further, because of the low mass of teeth 19 relative to that of the entire striker 18, coupling between bars is minimized.

When no longer held down by the operator, keylever 28 is restored to its original (solid line) position by spring 40, the yieldable mounting of bellcrank 52 allowing ear 57 to clear the free end 72 of striker 18 (now stationary against the tabs 21 of one or more bars 20A–F as shown in the solid line position in FIG. 2*a*). Having bypassed the end 72 of striker 18, Keylever 28 comes to rest with arm 39 against the upstop 46 under the urging of leaf spring 40.

The sharp blow from teeth 19 of striker 18 which th tabbed ones of the bars 20A–F receive as a result of the above-described flicking action by arm 16, induces sound energy in the form of sound waves within these bars. A distinct blow occurs, bounce being minimized because of the above-mentioned loading of striker 18 when initially at rest and also because of the presence of dampening material 17 affixed to the underside of striker 18, preferably not on the teeth 19 themselves but only on the portion supporting them. The previously-mentioned cork or plastic foam may be used as dampening material 17, being attached to striker 18 by gluing, for example.

The sound waves generated in the tabbed ones of the bars 20A–F travel in divergent directions, those traveling toward end 12L of the bars 20A–F do nothing, being reflected and/or dissipated at that end in known fashion, while those traveling toward the other end 12R of the bars 20A–F are sensed by the related transducers 22A–F and converted into corresponding electrical signals of periodic, alternating magnitude decreasing with time. For reasons of compactness, the transducers 22A–F are each affixed to one side of the related bar 20A–F (as seen in FIG. 1) rather than to its very end—as in the copending application—with leads 80A–F being the outputs and 79A–F being tied to ground. The ends of the bars 20A–F may be fanned out, if necessary, as shown in FIG. 1. These transducers are piezoelectric discs used in the 33 mode, and together with the electrical signals produced are more fully described in the above-identified copending application. It should be mentioned at this point that polarization, orientation, and positioning of transducers 22A–F stressed in that application are of little concern in the present invention because code generation here does not depend on measurements of elapsed times.

Turning next to the generation of code bits from the acoustic waves traveling in selected ones of the bars 20A–F, it is seen from FIG. 3 that the acoustic waves are converted into electrical signals by transducers 22A–F and transmitted along leads 80A–F which connect transducers 22A–F with respective parts of a signal conditioning circuit 116 provided for compatibility with the circuit elements of logic unit 24. Signal conditioning circuit 116 may comprise discriminating and clipping circuits similar—though not identical, as will be discussed—to the comparator circuits (115A, etc.) of the aforementioned copending application. The periodic alternating signals of decreasing amplitude emitted by transducers 22A–F and transmitted over leads 80A–F to the pulse conditioning circuit 116 emerge from this last on lines 82A–F as substantially unipolar pulse trains having a maximum voltage compatible with the input requirements of the circuits of logic unit 24, which circuits are preferably of the TTL (transistor-transistor logic) type, as will be seen. The portion of the circuits relating solely to a given one of the bars 20A–F will be referred to hereafter as the corresponding "channel" and designated by the appropriate one of the suffixes A–F.

The conditioned signals on lines 82A–F are captured in Channel Latch Circuits 97 as they appear, the time of appearance in each channel not necessarily being the same because of differences in positioning of transducers 22A–F and positioning of the tabs 21, possible skew in the strikers 18, etc. Arrival of the first of the signals at logic unit 24 via line 82A–F, starts a Cycle Timer 86. After an appropriate interval, i.e. subsequent to arrival of the last of the channel signals, timer 86 causes the information captured in the latch circuits 97 to be transferred to a Multibit Data Latch 84 adapted to receive and store separately the information output from the circuits 97, i.e. from the tabbed ones of the bars 20A–F. The corresponding code is then immediately available on lines 114A–F for display or recording in utilization device 7 or for control of such device. Subsequent to the transfer, the Channel Latch Circuits 97 are cleared of their contents through the action of a Reset Generator 94, so that the next key depression may be sensed and appropriate new code information developed.

Signal conditioning circuitry 116 has been introduced in the path of the six channels (leads 80A–F, etc) to provide compatability with the preferred electronic elements of logic unit 24—namely, TTL components. In general, signal conditioning circuitry 116 includes one of comparators 115A–F for each of the six code channels, each comparator 115A to 115F being provided with a reference voltage as one input (minus) and with an RC circuit 118 A–F, connected to a respective one of the transducer output lines 80A–F, as second input (plus). Each RC circuit 118A to 118F provides a filter for low frequency signals often met in modern business equipment. Ordinary signal diodes 125A–F are preferably included in RC circuits 118A–F to limit voltage excursions at the second input (plus) of each comparator 115A–F, but may be omitted if the circumstances warrant, i.e. if danger of damage to the comparator elements is minimal. The outputs of comparators 115A–F in circuitry 116 connect directly to logic unit 24 via lines 82A–F as mentioned above and discussed more fully later.

Consider next, the details of modification of the output signals from transducers 22A–F (typical signals being shown in FIG. 8 of the copending application) in reference to the section of the circuits shown at the left in FIG. 3 and generally identified by the heading "116" which corresponds to the signal conditioning circuitry. As shown in FIG. 3, the output side of, say, transducer 22A—that is, lead 80A—is connected to the junction 117A of a parallel-connected filter resistor 120A and a clipping diode 125A via an isolation capacitor 122A (capacitance 250 picofarads, for example). The resistor 120A is a unit of ordinary precision (10%) and its value (10 K ohms, say) is chosen (in conjunction with the capacitance) to achieve the desired filtering. The exact values of each are not critical since only the product is of importance with respect to filtering. The precision of the resistors used in the structure of the present invention is much less critical than in the copending application because elapsed times are not being determined herein and thus—in distinction over the circuits of the copending application—it is not necessary to minimize the chance that equal voltage for modified signals might be attained at significantly different portions of the wavefronts of the acoustic signals.

The junction 117A is connected by a lead 123A as an input to the "plus" terminal of comparator 115A while the "minus" terminal is connected by a lead 124 to a source of reference voltage, namely the slider 126 of a variable resistor 127 forming a voltage divider with a series-connected fixed resistor 128, the voltage divider being placed between a voltage source, V (e.g. 5 volts D.C. for the embodiment disclosed), and ground. Resistors 127, 128 are also ordinary precision (10%) resistors and need not be equal in value (for the embodiment disclosed, the latter may be about twice as high as the former: 20 K ohms vs 10 K ohms, respectively, say). The values are preferably such that the voltage at slider 126 is higher than the quiescent voltage of junction 117A, being adjustable for a given system as required. Moreover, the values are preferably also such as to balance (at least approximately) the impedance of the two inputs to each of the comparators 115A–F, as is common practice. The D.C. reference voltage at slider 126 may be stabilized by presence of a filter capacitor 131 (capacitance 0.1 microfarad, say).

When an alternating electrical signal is produced on output lead 80A of the transducer 22A in response to sensing an acoustic wave in bar 20A, an alternating voltage is developed at junction 117A and because of the comparator 115A, only positive cycles having an excursion greater than about 0.1 volt, say, cause a positive pulse to appear at line 82A. The output of comparator 115A when supplied with alternating signals is therefore a series of unipolar (positive) pulses, the first of the pulses being synchronous (or approximately so) with the wave front of the acoustic wave, and having a peak value compatible with the components of logic unit 24. The lines 82A–F complete channels A–F by connecting the output of comparators 115A–F with the logic unit 24 as previously stated (see FIG. 1 or FIG. 3).

Conditioning circuitry 116 contains identical components for the other channels B–F, these components being identified by the same numbers, except that they bear the appropriate different suffix. Being identical in structure and operation, the components for the other channels will therefore not be described further herein. Typical output signals issuing from comparators 115A–F are shown in FIG. 4 herein and in greater detail in FIG. 8*b* of the copending application.

As comparators 115A–F one may use readily available commercial integrated circuit devices, such as the low power, low offset voltage quad comparator package identified by the number LM 2901 and supplied by National Semiconductor Corp. of Sunnyvale, Calif. The LM 2901 is a lower performance unit than the LM 319 comparator specified in the copending application, but the requirements for the present invention are much less stringent, so its use affords a cost saving and it still serves the purpose well because it has four comparators in a single package and, just as with the LM 319, uncommitted collectors in each output stage allow the comparators to be readily made compatible with TTL circuit components by addition of pull up resistors (10 K ohms, say) 129A–F.

Before considering the individual elements of logic unit 24 in detail, a brief review of these will be given in reference to FIG. 3. As seen in that figure, the modified signals appearing on lines 82A–F are supplied to Channel Latch Circuits 97 where each causes the setting of a related latch 98A–F, the pulsating input signals thus being converted to levels and temporarily stored. The levels from the Channel Latch Circuits 97 appear on respective ones of the output lines 112A–112F (inversely) and 113A–F (positively). The first level change to occur on any of lines 112A–F initiates a cycle of the logic unit 24 by activating Cycle Timer 86, which governs both transfer of the information in the latches 98A–F to the multibit Data Latch 84 for control of the display in utilization device 7, and also the operation of Reset Generator 94 which clears the temporarily-stored information out of the latches 98A–F, as described in greater detail subsequently.

The Channel Latch Circuits 97 comprise a group of six identical "Set/Reset" (commonly termed "R-S") Latches 98A–F. These latches being identical in operation, only the first (98A) will be described. Latch 98A consists of a pair of two-input NOR-gates 99, 100 with the output (-1 and -4, the dash indicating the succeeding number is a suffix to the gate number which has been omitted for brevity) of each gate cross-connected with an input (-3 and -5, respectively) of the other gate by lines 102, 104 in a known fashion to form a memory device. Output line 82A of channel A forms the other input (-2) of NOR-gate 99. Accordingly, when a signal appears on channel A—that is, appears on line 82A—the first positive pulse of the signal passes through NOR-gate 99 and through cross connection 102, a change from high to low level (because of the inversion) will be supplied, as above indicated, to one input (-5) of NOR-gate 100. The other input (-6) of gate 100 is connected to a line 106 via a line 106*a*. That input (-6) is normally "enabled" (in a negative logic sense) since there is a low level on line 106, it being connected to the Q output of Reset Generator 94. The Q output of Reset Generator 94 is normally low, since Reset Generator 94 is activated (one shot 94 triggered to its "ON" state where Q is high) only at the end of the cycle, as will be seen. Thus, immediately upon appearance of a pulse on line 82A at the first-mentioned (-2) input to NOR-gate 99, the cross connection 102 between the output (-1) of NOR-gate 99 and the input (-6) of the "enabled" NOR-gate 100 results in both inputs being low such that the output (-4) of NOR-gate 100 goes high, i.e. essentially corresponding to passage of that pulse on line 82A through gate 100 with a slight delay. Then, via the cross connection 104 to the other input (-3) of NOR-gate 99, the delayed signal passes through the NOR-gate 99 to repeat the circulation and establish a continuous low on the output (-1) of NOR-gate 99 regardless of the pulsating nature of the signal on line 82A. This latching of the output of NOR-gate 99 (or an equivalent NOR-gate in latches 98B–98F) to a constant low state indicates that logic unit 24 is "ON"—that a cycle has begun and data sampling must follow at an appropriate time, as explained below.

The Channel Latch Circuits 97 may be implemented by appropriate interconnection of NOR-gates from the sets of four in the integrated circuit packages of the 74 series manufactured by Texas Instruments Inc., Dallas, Tex., and identified by the model number 7402.

The inverting output (-1) of NOR-gate 99 in latch 98A goes to the Cycle Timer 86 via a multi-input NAND-gate 110 (at least six inputs being needed for the embodiment disclosed herein). The signals on the lines 112A–F which connect the output 99-1 of NOR-gate 99 and the similar outputs from the equivalent NOR-gates (not numbered) of latches 98B–F to respective inputs 110-1 to 110-6 of NAND-gate 110, are again inverted. Thus, positive pulse trains appearing on any of the lines 82A–F are essentially ORed (because of the logic combination) into the one shot 86 substantially simultaneous to entry into the R-S latches 98A–F. NAND-gate 110 is likewise commercially available from Texas Instruments in the 74 series as an 8-input logic unit identified by the number 74030 (two of the inputs being inactivated in known fashion, therefore, for purposes of the present embodiment).

The function of Cycle Timer 86 is to determine the length of the cycle in logic unit 24. As mentioned, the cycle starts with sensing of the level corresponding to the first signal to appear on any of the channel lines 82A–F and must end well after the last meaningful transition of the last signal on those lines. For simplicity and low cost, Cycle Timer 86 also controls sampling of the information from the channel lines 82A–F. The duration of each signal is determined primarily by "ringing" encountered when the corresponding bar 20A–F is struck. The ringing is undesirable, but unavoidable. As mentioned in the copending application, a characteristic of the ringing in bars 20A–F is that it may fade for a brief moment and then crop up again in consequence of striker 18 bouncing against the bars 20A–F despite all measures taken to avoid such bouncing. This characteristic prompts choice of a suitably long delay (15 milliseconds, say) before ending the cycle. A delay of this magnitude insures that the output signals on lines 80A–F will definitely have subsided prior to resetting R-S latches 98A–F. Upon ending the cycle, timer 86 does two things: (1) transfers the status of the latches 98A–F to Data Latch 84 controlling the display 7, shown in the form of six light-emitting units in FIG. 1; and (2) triggers Reset Generator 94, causing it to emit a short pulse to interrupt a previously enabling input (e.g. the above-mentioned low level on NOR-gate input 100-6) to the latches 98A–F.

Cycle Timer 86 may be a one shot, as referred to hereinafter, having a line 108 connected from its clock input B (which responds only to the positive-going edge of a signal, as will be seen) to the output (-8) of NAND-gate 110. The one shot 86 is preferably a retriggerable monostable circuit of the TTL type, a dual unit being manufactured by Texas Instruments, Dallas, Tex. and identified by the model number 74-123 of the 74 series. The one shot 86 includes not only the high-level-active input B for responding to positive-going clock pulses, but also a low-level-active input A and an overriding direct clear input R. Neither of the latter two is used, however, so they are incapacitated by being tied to ground and to the source of voltage V, respectively, as seen in FIG. 3. The reason for the difference in mode of incapacitation is that the clear circuit contains an internal inverter, as indicated in customary fashion by the circle at the input R of one shot 86. The output of one shot 86 which is used herein is the complementary one, $\overline{Q}$, and accordingly when a positive-going level change attendant upon appearance of the first positive pulse on a line 82A–F is received on line 108 from the output (-8) of NAND-gate 110, one shot 86 is triggered and the output $\overline{Q}$ goes low.

The $\overline{Q}$ output of one shot 86 is controlled through timing circuit 87, a capacitor/resistor combination consisting of a resistor 88 in series with capacitor 89, the two being connected between voltage source V and an input 90 of one shot 86. Junction 91 between resistor 88 and capacitor 89 is connected to input 92 of one shot 86 through a diode 93 for preventing application of reverse voltage across capacitor 89, which is preferably an electrolytic capacitor because the desired pulse duration provided by R-C circuit 87 is in the range of milliseconds, as will be seen. A variable resistor 88A may be added in series with the resistor 88 for trimming purposes. Resistors 88 and 88*a* may have values, for example, of 5 Kohms and 50 Kohms (max), respectively, and capacitor 89 may have a value of 10 microfarads. For the embodiment disclosed, the total resistance is preferably adjusted to provide a pulse duration of 15 milliseconds which has been found to be sufficient delay.

Lead 108 is connected to the B input of one shot 86, it will be recalled. Hence, when a positive-going pulse appears on that lead, as previously described, the voltage at junction 91 of the capacitor/resistor combination 87 is momentarily grounded, discharging capacitor 89, but subsequently allowing it to recharge and approach a given voltage. Attainment of that given voltage is necessary for return of one shot 86 to its original state, in known fashion. Therefore, some time after the last pulse of the last signal, ringing in all the bars 20A–F having ended, capacitor 89 will have recharged to the given voltage (recharge ocurring in approximately 15 milliseconds, as mentioned above), such that the $\overline{Q}$ output of one shot 86 thereupon shifts back to a high level, signifying that the cycle of logic unit 24 is to terminate.

Upon reappearance of a high level at the $\overline{Q}$ output of one shot 86, the resultant positive-going signal is applied via lines 140, 140*a* to the clock inputs (C and B, respectively) of multibit Data Latch 84 and Reset Generator 94. Data Latch 84 is preferably a TTL circuit of the D type containing six flip flops. A commercially available unit is the hex D latch manufactured by Texas Instruments and identified by model 74–174 of the 74 series. The hex D latch comprises six inputs D1 to D6 for receiving bit information and six outputs Q1–Q6 for indicating the information stored. As seen in FIG. 3, lines 113A–F connect the positive data outputs (e.g. 100-4 for Channel A) of Channel Latch Circuits 97 with the inputs D1–D6 of Data Latch 84, and the lines 114A–F connect the outputs Q1–Q6 of Data Latch 84 with utilization device 7.

The clock signal for Data Latch 84 is a positive-going change in level, e.g. a change from low to high. Thus, when the above-mentioned positive-going change in level at the $\overline{Q}$ output of one shot 86 appears at clock input C of the Data Latch 84 via line 140*a*, information transfer occurs and the data previously present only on lines 113A–F now also appear at the outputs Q1–Q6 of Data Latch 84. The data signals on leads 113A–F from the Channel Latch Circuits 97 are thus seen to be transferred to the output leads 114A–F of Data Latch 84 only after sufficient time has clearly elapsed to assure receipt of all bits of the code. While the end of the cycle occurs at a time much later than that, the single signal from one shot 86 is used for both purposes for obvious reasons of economy. It may be mentioned that Data Latch 84 is never cleared, the next positive-going change in level destructively entering new information which appears on lines 114A–F.

The leads 114A–F are connected to the utilization device 7, which may be a luminous display as indicated in FIG. 1. Device 7 includes inverters 132A–F each operatively connecting a respective one of the outputs Q1–Q6 of the hexadecimal D type Data Latch 84 with light-emitting diodes 134A–F. Inverters 132A–F are TTL circuit inverter buffers/drivers with open-collector high voltage outputs, commercially available from Texas Instruments and identified as model number 7406 of the 74 series. A respective one of light-emitting diodes 134A–F is connected with each inverter 132A–F through a corresponding current-limiting resistor 133A–F. The inverter-resistor-diode combination forms the display 7. When the code bits appear on the lines 114A–F from outputs Q1–Q6 of Data Latch 84, each high level corresponding to a "1" in the information is inverted and the resultant low voltage applied to the related one of the resistors 133A–F turns on the LED attached thereto, thereby immediately supplying a luminous presentation of the "1" in that channel corresponding to the code for the keybutton 26 depressed by the operator. In FIG. 1, the bits "010111" are depicted, the LED's in the leftmost position and the third from left position being off (black), corresponding to the output to be displayed when the operator has depressed the keylever 28 shown in FIG. 2*a*. That this would be the correct display is evident from the absence of tabs 21 in that portion of the bars 20D, 20F adjacent to striker 18 in FIG. 2*a*. When the keylever 28 of FIG. 2*a* is depressed, that absence prevents generation of sound waves in bars 20D, 20F, corresponding to the highest and the next-but-one to the highest bits of the display 7 in FIG. 1.

Reset Generator 94 is provided to generate a reset pulse at the end of the cycle of logic unit 24 (as mentioned earlier) the reset pulse being used only for clearing R-S latches 98A–F to the ready condition. Reset Generator 94 may be a one shot—as termed hereinafter—identical to the Cycle Timer one shot 86, being contained—for example—in the same dual TTL package identified by the number 74-123. One shot 94 is likewise controlled by an R-C timing network 95 as shown in FIG. 3. R-C timing network 95 determines the width of the reset pulse, generated in this instance at the output Q of one shot 94. For the present invention, a pulse width of approximately 1 microsecond is ample for the required function (e.g. a resistor of 10 Kohms and a capacitor of 200 micofarads would be suitable). As mentioned earlier, when the active state of one shot 86 ceases and its output $\overline{Q}$ shifts from a low to a high level, the positive-going level change at clock input B of one shot 94 triggers that one shot. The above-described reset pulse is then generated at the output Q of one shot 94 and transmitted via line 106 to the Channel Latch Circuits 97. When the reset pulse appears, for example, at the -6 input of NOR-gate 100 via line 106A tapped to line 106, the output of that gate goes low and through line 104 puts a low value at the -3 input of NOR-gate 99. Because the other input (-2) of NOR-gate 99 is likewise low at this time, i.e. the end of the cycle, then the disappearance of a high level on both inputs of NOR gate 99 results after a slight delay in producing a high level at its output 99-1, this high level being transferred via the interconnection 102 to the -5 input of NOR-gate 100 and thus, again after a slight delay, the latch 98A is reset in known fashion. The other latches 98B–F are reset in identical manner by the pulse on line 106, so their resetting will not be described. It is to be particularly noted however, that because of the gate delays, resetting of latches 98A–F in Channel Latch Circuits 97 occurs subsequent to transfer of the previously existing information into storage in Data Latch 84. The apparent race condition is non-existent because of these gate delays, evident at right end of the signals shown in FIG. 4.

In summary, the above description of a multibar encoding apparatus utilizing acoustic energy, comprises impact by a striker 18 with selected ones of a set of bars 20A–F as caused by a mechanical motion (such as depression of a keybutton 26). Selectivity of impact is achieved by providing striker 18 with teeth 19 which contact only those of the bars 20A–F which bear a tab 21 adjacent the teeth 19. Impact between teeth 19 and one or more tabs 21 induces within the selected bars acoustic waves which travel to related ones of transducer devices 22A–F, there being one such transducer operatively connected to each of the bars 20A–F. Each transducer 22A–F is positioned along its respective bar 20A–F at approximately the same distance from any given striker 18, and converts the received acoustic wave into an electrical output signal. Therefore, when there is an impact or blow from teeth 19 of striker 18 upon the tips 25 of adjacent tabs 21 borne by the bars 20A–F, the acoustic waves selectively originated in one or more of the bars 20A–F give rise to electrical signals which become available on lines 82A–F at roughly the same time. The coarsely timed electrical signals from the activated ones of the transducers 22A–F are temporarily stored in latches 98A–F and subsequently issued simultaneously under control of a logic unit 24, appearing in parallel as individual bits of the unique code at a more permanent multibit latch 84 for supply to utilization device 7. There they may directly control light-emitting diodes (LED's), for example. Though disclosed as controlling a simple luminous binary display, the code might equally and more complexly control an alpha-numeric display unit, or a multi-print-wheel data recorder, or any data-processing equipment.

When a sufficient time has elapsed after receipt of the electrical (data) signals to insure that the originating acoustic waves have vanished from the bars 20A–F and their counterpart pulse trains from lines 82A–F, the logic unit 24 is reset to prepare for the next key depression (or typewriter function).

The present invention may be embodied in other specific forms without departing from the spirit or essential characteristics thereof. In particular, as will be evident to those skilled in the art, coding could be achieved by providing tabs 21 at all possible positions on bars 20A–F, but selectively removing particular combinations of teeth 19 from each striker 18. Moreover, while the term "character" is often limitingly associated with keylevers such as 28, it will be clear to those skilled in the art that typewriter functions can also be encoded by the same technique.

Likewise, while logic unit 24 has been described as making use of electronic delays (i.e., one shots), it will be evident to those skilled in the art that other delay techniques could be used. In particular, it is envisioned that the delay could actually be accomplished by providing an additional (seventh) bar 20G and displacing its transducer 22G with respect to the transducers on the other bars 20A–F as shown in broken lines in FIG. 1, the output of transducer 22G being supplied to the conditioning circuits 116 and logic unit 24 via lines 80G and 82G in the same fashion as described for the bars 20A–F, or—if this cannot produce enough delay—by increasing the effective length of the added bar 20G by adding a loop at end 12R, or by changing the material to one having a lower sonic velocity, etc., such that the signals received by transducer 22G would be later than those received by the transducers 22A–F by a predetermined amount. This approach would permit discriminating against false inducements of acoustic energy in the other bars 20A–F. Furthermore, it follows that upper and lower case codes could be distinguished in known fashion by provision for an additional "bit" of information or a different combination of bits either in response to closure of a switch operated by the usual care shift key 150 or as shown in FIG. 5, by utilizing yet another additional bar 20H and transducer (not shown, but similar to 22A–F in type, location, and electrical connections) together with movable frames 74, the additional bar 20H being contactable upon depression of a keylever 28 when the frames 74 are held in a first position (solid lines in FIG. 5), but being isolated when the frames 74 are moved to a second position (broken lines 152 in FIG. 5, gap 154 being under bar 20H in the second position). Other modifications will be evident to those skilled in the art and these too are intended to fall within the scope of the invention as defined by the appended claims.

The presently disclosed embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An apparatus for generating an n-bit code representative of a mechanical motion for output to a utilization device comprising:

(a) n members for transmitting vibratory energy, (b) means supporting said n members in vibratory isolation, (c) means for inducing vibratory energy within at least a selected one of said n members in response to said mechanical motion, (d) means operatively connected to each of said n members for transducing said induced energy into a respective bit of said n-bit code, and (e) output control means connected to said transducing means, said output control means being responsive to transducing of induced energy in a first one of said n members and operable to effect output of the n-bit code to said utilization device only after a time interval sufficient for transducing of any induced energy in the remainder of said n members.

2. The apparatus as defined in claim 1, together with a depressible key, said mechanical motion being the depression of said key.

3. The apparatus as defined in claim 1 together with a keyboard having at least two depressible keys, wherein said inducing means are activated by depression of each said key for imparting vibratory energy to at least a predetermined different one of said n members.

4. The apparatus as defined in claim 3 wherein each of said n members is elongate.

5. The apparatus as defined in claim 4, wherein the vibratory energy is acoustic energy and said inducing means comprises a striker corresponding to each said key, said striker being operable to impact at least a different one of said members and induce acoustic energy therein in response to depression of the corresonding key.

6. The apparatus as defined in claim 5, wherein said transducing means comprises an acoustic transducer operatively connected to each said elongate member at a location substantially equally distant from any given one of said strikers.

7. The apparatus as defined in claim 6, wherein said elongate members are rectangular bars.

8. The apparatus as defined in claim 4, wherein said inducing means comprises a flexible spring corresponding to each said key and mounted for movement from a relaxed first position to a flexed second position and return toward said first position for selectively striking the predetermined ones of said members in response to depression of the corresponding key.

9. The apparatus as defined in claim 8, wherein said members are rectangular bars, each of said predetermined members being a bar bearing a tab on an edge thereof adjacent said spring.

10. The apparatus as defined in claim 8, wherein said steel spring comprises at least one laterally-projecting tooth in alignment with a said member.

11. The apparatus as defined in claim 8, wherein said members are rectangular bars, all said bars bearing tabs on an edge thereof adjacent each said spring and said spring comprising a number of laterally-projecting teeth, each cooperating with the tab of at least one different bar, said number of teeth being at most equal to n.

12. The apparatus as defined in claim 11, wherein said apparatus includes a frame and said supporting means comprise a plurality of pairs of thin wires, one pair being associated with each bar, and each wire of a pair having the ends thereof clamped to said frame while in a taut state, separate portions of each wire engaging opposite sides of the associated bar and extending transversely thereof near a corresponding end of the bar, whereby said bar is fixedly supported.

13. The apparatus as defined in claim 12, wherein said associated bar has two vertically spaced perforations near said corresponding end and each said wire of a pair passes successively through respective ones of said perforations to engage said opposite sides thereby providing a fixed support when tautened and clamped to said frame.

14. The apparatus as defined in claim 1, wherein said output control means are effective only after said vibratory energy has dissipated and said transducing means each include a latch for storing said respective bit, said output control means being connected to said latches and effecting output of the bits stored therein with subsequent clearance of each said latch.

15. An apparatus for generating a code representative of a mechanical motion comprising:

(a) n members for transmitting vibratory energy,
(b) means supporting said n members in vibratory isolation, including a frame and a plurality of tension members mounted in said frame, respective ones of said plurality of tension members being associated with each of said n members for fixed support thereof relative to:
(c) means for inducing vibratory energy within at least a selected one of said n members in response to said mechanical motion; and
(d) means operatively connected to each of said n members for transducing said induced energy into a respective bit of an n-bit code representative of the mechanical motion.

16. The apparatus as defined in claim 15 wherein said n members are rectangular bars.

17. The apparatus as defined in claim 16, wherein said supporting means comprise a plurality of pairs of thin wires, one pair being associated with each bar, and each wire of a pair having the ends thereof clamped to said frame while in a taut state, separate portions of each wire engaging opposite sides of the associated bar and extending transversely thereof near a corresponding end of the bar, whereby said bar is fixedly supported.

18. The apparatus as defined in claim 17 wherein said associated bar has two vertically spaced perforations near said corresponding end and each said wire of a pair passes successively through respective ones of said perforations to engage said opposite sides thereby providing a fixed support when tautened and clamped to said frame.

19. An apparatus for generating a code representative of a mechanical motion comprising:

(a) n elongate members for transmitting vibratory energy
(b) means supporting said n members in vibratory isolation
(c) a flexible spring for inducing vibratory energy within at least a predetermined one of said n members in response to said mechanical motion, said spring being mounted for movement from a relaxed first position to a flexed second position and return toward said first position for striking said predetermined member, and
(d) means operatively connected to each of said n members for transducing said induced energy into a respective bit of an n-bit code representative of the mechanical motion.

20. The apparatus as defined in claim 19, wherein said members are rectangular bars, said predetermined one member being a bar bearing a tab on an edge thereof adjacent said spring.

21. The apparatus as defined in claim 19 wherein said spring comprises at least one laterally-projecting tooth in alignment with a said member.

22. The apparatus as defined in claim 19, wherein said members are rectangular bars, all said bars bearing tabs on an edge thereof adjacent said spring and said spring comprising a number of laterally-projecting teeth, each tooth cooperating with the tabs of a predetermined bar, and the number of teeth being at most equal to n.

23. The apparatus as defined in claim 19 together with a keyboard having at least two depressible keys, each key cooperating respectively with a said flexible spring, and effective upon depression of a said key for imparting vibratory energy to at least a predetermined different one of said n members, further including an additional vibratory energy propagating member with a corresponding transducer, said last-mentioned member having vibratory energy induced therein in response to a depression of any of said keys and the signal from the transducer of said additional member being delayed with respect to the signals from transducers of any of the n remaining members; and means to enable transfer of the last-mentioned signals to a utilization device in response to said signal from the transducer of the additional member, said transfer being normally disabled.

24. In an encoding keyboard having a plurality of depressible keys each identifiable by a discrete n-bit code for output to a utilization device, the combination of:

(a) n members for propagating acoustic energy, each said member having a plurality of rigid projections,
(b) means supporting said n members in acoustic isolation,
(c) means for inducing acoustic energy within at least a preselected discrete one of said n members in response to depression of each key by resiliently impacting a related one of said projections on said preselected member to induce said acoustic energy, thereby forming a wave front traveling within each said preselected member, (d) means operatively connected to each of the n members for transducing a said wave front into a respective signal, (e) means connected to said transducing means and operable to generate the n-bit code identifying said depressed key in conformity with the respective signals from the transducing means, and (f) output control means connected to said transducing means, said output control means being responsive to first sensing of induced energy in any one of said n members and operable to effect output of the n-bit code to said utilization device only after a time interval sufficient for sensing of any induced energy in the remainder of said n members.

25. An encoding keyboard as defined in claim 24, wherein the n members are elongate and each of said transducing means is located at substantially the same distance from said acoustic energy inducing means.

26. The encoding keyboard as defined in claim 25, wherein said elongate members are rectangular bars.

27. The encoding keyboard as defined in claim 26, wherein said bars are in generally straight parallel arrangement, and the acoustic energy inducing means comprise strikers operated by respective ones of said keys, each striker cooperating with discrete ones of the bars in response to depression of the respective key.

28. The apparatus as defined in claim 24, wherein said output control means are effective only after said vibratory energy has dissipated and said transducing means each include a latch for storing said respective signal, said output control means being connected to said latches and effecting output of the stored signals with subsequent clearance of each said latch.

29. An encoding keyboard as defined in claim 25, wherein there is an additional acoustic energy propagating member with a corresponding transducer, said last-mentioned member having acoustic energy induced therein in response to depression of any of said keys.

30. An encoding keyboard as defined in claim 29, further comprising means including said additional member for discriminating against false inducements of sound energy within any of said n members, thereby preventing generation of an n-bit code falsely indicative of depression of a particular key.

31. A method for generating an n-bit code representative of a detectable mechanical motion which comprises the steps of:

(a) providing n members susceptible of propagating vibratory energy, (b) supporting said n members in vibratory isolation, (c) resiliently striking at least a selected one of the n members upon detection of the mechanical motion, thereby inducing vibratory energy in each selected member, (d) transducing the vibratory energy in each said selected member into a coarsely timed output signal, and (e) generating said representative code from the coarsely timed output signals of said n members only after delaying for a time interval sufficient to obtain the transduced output signals from all said selected members.

32. A method for generating a code representative of a detectable mechanical motion comprising the steps of:

(a) providing n members susceptible for propagating acoustic energy, (b) supporting said n members in acoustic isolation, (c) providing a resilient striker having portions differentially associated with discrete ones of said n members, (d) flicking said striker upon detection of the mechanical motion to impact selectively said n members for purposes of inducing acoustic energy therein, (e) transducing vibratory energy in each said selected member into an output signal, and (f) generating said representative code from the output signals of said n members.

33. The method of claim 31, or claim 32 further including the steps of:

(f) providing a manually depressible key, and (g) generating said mechanical motion upon depression of the key.

34. The method of claim 32, wherein said flicking comprises flexing said striker at least partly in torsion.

35. The code-generating method as defined in claim 31, wherein said induced vibratory energy has limited duration and said time interval exceeds said duration and further including the penultimate step of temporarily storing said coarsely timed signals.

36. In an encoding keyboard having a plurality of depressible keys each identifiable by a discrete n-bit code, the combination of:

(a) n elongate bars for propagating acoustic energy, said bars being in generally straight parallel arrangement (b) means isolatingly supporting said n bars, (c) impact means for inducing acoustic energy within at least a preselected discrete one of said n bars in response to depression of each key, said acoustic energy forming a wave front traveling with each said preselected bar and said impact means comprising springs having an upper surface substantially defining a single plane and being momentarily flexed at least partly in torsion in response to said key depression, and at least one of said n bars having a tab portion with a point lying in said plane for impact by said upper surface;

(d) means operatively connected to each of the n bars for transducing a said wave front into a respective signal, and (e) means connected to said transducing means and operable to generate the n-bit code identifying said depressed key in conformity with the respective signals from the transducing means.

37. An encoding keyboard having a plurality of depressible keys each identifiable by a discrete n-bit code, together with a case-shift control, in combination with (a) n code members plus an additional member for propagating acoustic energy, (b) means isolatingly supporting said members, (c) means for inducing acoustic energy within at least a preselected discrete one of said n code members in response to depression of each key, said acoustic energy forming a wave front traveling within each said preselected code member;

(d) means operatively connected to each of the n code members for transducing a said wave front into a respective signal, (e) means connected to said transducing means and operable to generate the n-bit code identifying said depressed key in conformity with the respective signals from the transducing means, (f) a frame mounted for movement between first and second positions, (b) normally-disabled means responsive to depression of any of said keys and effective when enabled to induce acoustic energy in the additional member; said normally disabled means being enabled only when said frame is in the second position, and (h) means responsive to said case-shift control for moving the frame to said second position.

* * * * *